United States Patent
Geser et al.

(10) Patent No.: US 10,731,752 B2
(45) Date of Patent: Aug. 4, 2020

(54) CONTROL METHOD AND CONTROL DEVICE IN A MOTOR VEHICLE FOR SHIFTING AN AUTOMATIC TRANSMISSION

(71) Applicant: Bayerische Motoren Werke Aktiengesellschaft, Munich (DE)

(72) Inventors: Andreas Geser, Karlsfeld (DE); Stefan Prasser, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 67 days.

(21) Appl. No.: 15/893,979

(22) Filed: Feb. 12, 2018

(65) Prior Publication Data
US 2018/0163856 A1    Jun. 14, 2018

Related U.S. Application Data

(63) Continuation of application No. PCT/EP2016/065806, filed on Jul. 5, 2016.

(30) Foreign Application Priority Data

Aug. 13, 2015 (DE) .................. 10 2015 215 445

(51) Int. Cl.
*F16H 61/02* (2006.01)
*F16H 59/18* (2006.01)
(Continued)

(52) U.S. Cl.
CPC ......... *F16H 61/0213* (2013.01); *F16H 59/18* (2013.01); *F16H 59/44* (2013.01);
(Continued)

(58) Field of Classification Search
None
See application file for complete search history.

(56) References Cited

U.S. PATENT DOCUMENTS

| | | |
|---|---|---|
| 6,292,736 B1 | 9/2001 | Aruga et al. |
| 2008/0125946 A1 | 5/2008 | Fakler et al. |

(Continued)

FOREIGN PATENT DOCUMENTS

| | | |
|---|---|---|
| CN | 103758995 A | 4/2014 |
| CN | 104074964 A | 10/2014 |

(Continued)

OTHER PUBLICATIONS

Chinese-language Office Action issued in counterpart Chinese Application No. 201680042435.X dated Jan. 2, 2019 with English translation (nine (9) pages).

(Continued)

*Primary Examiner* — Timothy Hannon
(74) *Attorney, Agent, or Firm* — Crowell & Moring LLP

(57) ABSTRACT

In a control method and a control device for shifting an automatic and, in particular, non-powershift-capable transmission having at least two gears, data of a driving-speed-related data source are received by at least one electronic control unit for a defined forecast range. The data are such that the control unit can determine therefrom a region at least lying in the forecast range and having a limit speed below the maximum speed of the lower gear. If such a region was actually detected in the forecast range, either the lower gear is maintained or shifting is performed from the higher gear to the lower gear. Shifting back to the lower gear is preferably performed only if a driver power request value lies below a defined threshold and the driving speed lies below the maximum speed of the lower gear.

9 Claims, 2 Drawing Sheets

(51) Int. Cl.
*F16H 59/44* (2006.01)
*F16H 59/66* (2006.01)

(52) U.S. Cl.
CPC ....... *F16H 59/66* (2013.01); *F16H 2059/666* (2013.01); *F16H 2061/022* (2013.01)

(56) References Cited

U.S. PATENT DOCUMENTS

| | | |
|---|---|---|
| 2010/0179726 A1 | 7/2010 | Leinung |
| 2011/0190972 A1 | 8/2011 | Timmons et al. |
| 2013/0038438 A1 | 2/2013 | Olsen et al. |
| 2015/0111681 A1 | 4/2015 | Wirth et al. |
| 2015/0176687 A1 | 6/2015 | Smetana et al. |

FOREIGN PATENT DOCUMENTS

| | | |
|---|---|---|
| DE | 198 35 854 A1 | 2/1999 |
| DE | 10 2006 030 899 A1 | 7/2007 |
| DE | 10 2006 030 528 A1 | 1/2008 |
| DE | 10 2011 009 665 A1 | 12/2011 |
| DE | 10 2011 004 862 A1 | 8/2012 |
| DE | 10 2011 005 962 A1 | 9/2012 |
| DE | 10 2011 080 712 A1 | 2/2013 |
| DE | 10 2012 017 352 A1 | 5/2014 |
| DE | 10 2014 203 668 A1 | 9/2015 |
| DE | 10 2014 106 820 A1 | 11/2015 |
| WO | WO 2009/010196 A1 | 1/2009 |
| WO | WO 2014/008896 A1 | 1/2014 |

OTHER PUBLICATIONS

International Search Report (PCT/ISA/210) issued in PCT Application No. PCT/EP2016/065806 dated Sep. 16, 2016 with English translation (five pages).

German-language Written Opinion (PCT/ISA/237) issued in PCT Application No. PCT/EP2016/065806 dated Sep. 16, 2016 (six pages).

German-language Search Report issued in counterpart German Application No. 10 2015 215 445.9 dated Jun. 7, 2016 with partial English translation (13 pages).

Schaal et al.,"Car2X-von der Forschung zur Serienentwicklung", Elektronik automotive, Dec. 2012, six pages, eiten 19 bis 23.

"Deliverable D21.4; Spezifikation der Kommunikationsprotokolle", Sichere Intelligente Mobilitaet Testfeld Deutschland, sim $^{TD}$, Version 1.0, Sep. 29, 2009, 150 pages, Seiten 1 bis 44.

"Sichere Intelligente Mobilitaet Testfeld Deutschland", fakten, Oct. 2011, 22 pages, Seiten 1 bis 40, www.simTD.de.

CONTROL METHOD AND CONTROL DEVICE IN A MOTOR VEHICLE FOR SHIFTING AN AUTOMATIC TRANSMISSION

CROSS REFERENCE TO RELATED APPLICATIONS

This application is a continuation of PCT International Application No. PCT/EP2016/065806, filed Jul. 5, 2016, which claims priority under 35 U.S.C. § 119 from German Patent Application No. 10 2015 215 445.9, filed Aug. 13, 2015, the entire disclosures of which are herein expressly incorporated by reference.

BACKGROUND AND SUMMARY OF THE INVENTION

The invention relates to a control method and control device for shifting an automatic, and in particular, non-powershift-capable transmission in a vehicle.

Vehicles with powershift-capable transmissions cannot generally use all gears since the long shifting breaks lead to a tractive power interruption, which are perceived as disturbing, particularly in the case of upshifting. The BMW i8 serves as an example. At its front axle, it has an electric engine that transmits power to the street via a two-gear transmission (not powershift-capable). Due to an RPM limit, the first gear can only be used up to approx. 120 km/h. Then, at the latest, a shift must be made into second gear to increase the vehicle's speed. In order to avoid this gear shift, up until this point, starting to drive in automatic mode with an optionally startable combustion engine ("Auto eDrive") is already always performed in second gear. The first gear is only used in the pure electric mode ("Max. eDrive") at a limited vehicle speed. Please refer to non-published DE 10 2014203668.2 by the Applicant for further technical background regarding this operation.

Starting to drive in the second gear, in the case of the BMW i8 in particular, has the following disadvantages.

On the one hand, you can only start driving with less wheel torque. In automatic mode ("Auto eDrive"), this causes a frequent start-up of the combustion engine. This results in a poorer electric driving experience.

On the other hand, in the case of full-load acceleration from a standing position, the electric engine can only render full performance in second gear at a higher speed than in first gear. You cannot start driving as quickly as in the first gear.

It is the object of the invention, in particular in the case of non-powershift-capable transmissions, to improve comfort on the one hand, and the ability to accelerate on the other.

The task is solved according to the invention by a control method and control device according to embodiments of the invention.

In the case of the control method according to the invention and in the case of the control device according to the invention, for shifting an automatic, in particular, a non-powershift-capable transmission, which has at least two gears, data of a driving-speed-related data source are received by at least one electronic control unit for a defined forecast range. Such data sources are, for example, navigation systems, car-to-car systems, transmitting road signs or other telecommunicated digital data. The data are such that the control unit can determine therefrom a region at least lying in the forecast range and having a limit speed below the maximum speed of the lower gear. If such a region was actually detected in the forecast range, either the lower gear is maintained or shifting is performed from the higher gear to the lower gear.

Shifting back to the lower gear is preferably performed only if a driver power request value (in particular, the accelerator pedal angle) lies below a defined (first) threshold and the driving speed lies below the maximum speed of the lower gear. The first threshold can be defined in such a way that the presence of a steady speed or a propulsion operation is ensured.

A shift is preferably made from a lower gear to a higher gear if, within a transition region between the region with the limit speed under the maximum speed of the lower gear and a region with a limit speed or a possible driving speed to be expected over the maximum speed of the lower gear, a driver power request value is under a defined (second) threshold and the driving speed is under the maximum speed of the lower gear.

The first threshold and the second threshold can be defined in the same way, or in terms of a hysteresis, be defined similarly, but differently.

The invention is based on the following considerations.

The disadvantages of a gear shift with comparably longer shifting disruptions only occur when the sample vehicle described above increases its speed to over 120 km/h—meaning over the maximum speed of the lower (e.g. first) gear. Therefore, the invention provides for a navigation-based shifting strategy. The vehicle recognizes if it is in a region with a limit speed under the maximum speed of the lower gear or if it approaches such a region (e.g. speed limit, 50, 60 or 80 km/h). In this region, a desire of the driver to accelerate beyond the maximum speed (e.g. 120 km/h) is unlikely.

So, for example, in an urban environment, according to the invention, the lower gear is maintained or shifted back into.

If the vehicle detects that it is approaching the city limits and will leave the city region (speed limit the same or over 100 km), the transmission shifts to the next highest (e.g. second) gear at a comfort-oriented moment, particularly at a steady speed and/or in a propulsion phase.

By means of this, particularly in the urban environment, driving with a higher electric wheel torque is possible, whereby, for example, the above-mentioned hybrid vehicle becomes more robust at start-up and a great electrical driving experience is achieved. In addition, the vehicle's absolute ability to accelerate in the urban environment increases.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
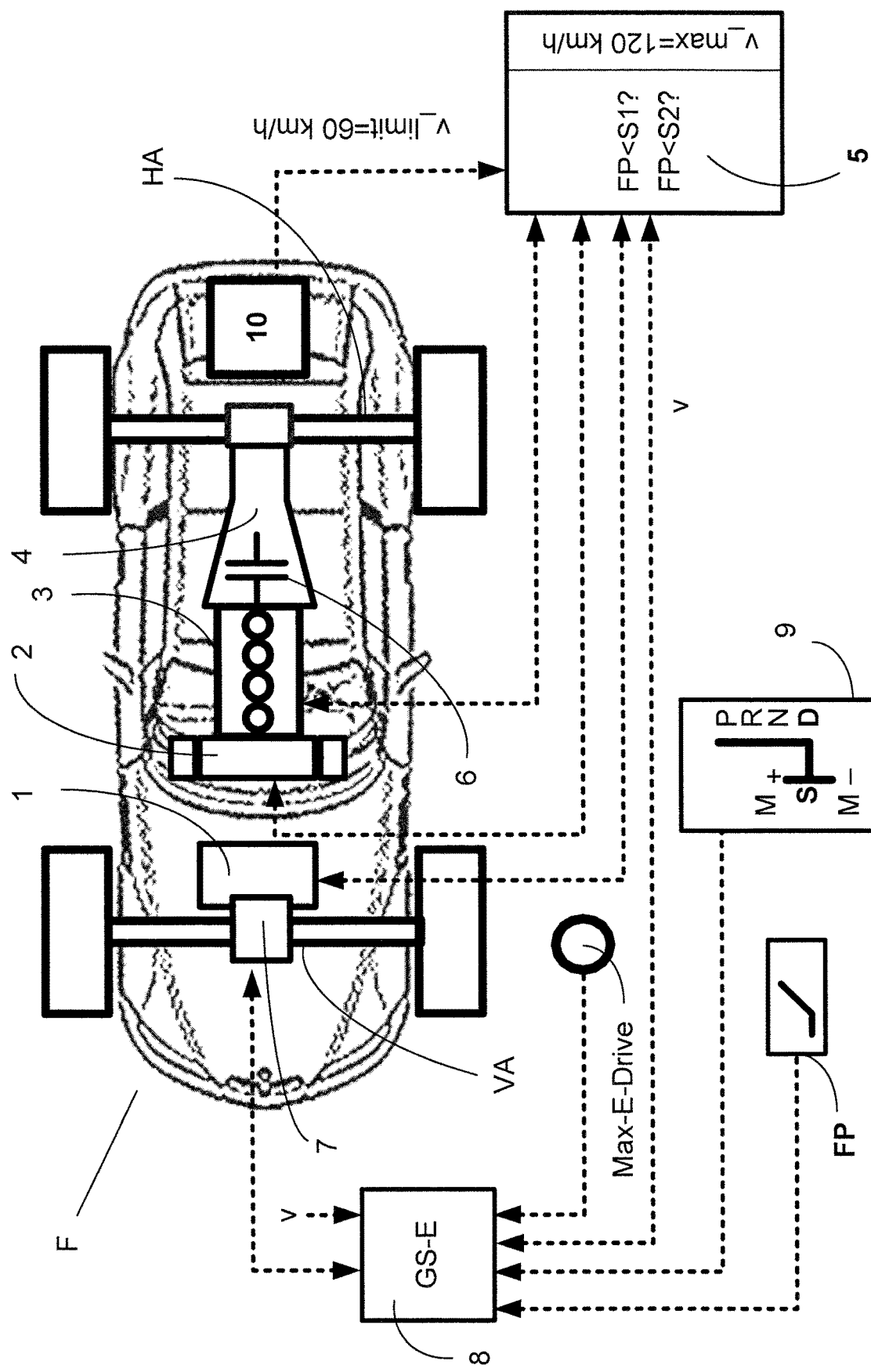
FIG. 1 shows a schematic representation of a street-coupled hybrid vehicle with the components that are important to the invention.

In FIG. 1, a so-called street-coupled hybrid vehicle F (e.g. a BMW i8) with an electric engine 1, which, as a drive engine, has an effect on the front axle VA for example, and with a combustion engine 3, which has an effect on the rear axle HA, is illustrated. The electric engine 1 interacts with a two-gear transmission 7 without an interconnected clutch. This two-gear transmission 7 is an example for a non-powershift-capable transmission, to which the invention preferably refers.

A second electric engine 2 can be provided in addition to the combustion engine 3. Furthermore, a second transmission 4 preferably in the form of an electronically controllable automatic transmission (as is already known from the most recent background art of BMW serial vehicles) is connected on the input side to the combustion engine 3. Similarly, the invention can also be used with a different sequence of the components 2, 3 and 4. The electric engine 1 could also be arranged on the rear axle and the combustion engine 3 can be arranged on the front axle.

Furthermore, the hybrid vehicle F has a selection device ("Max-eDrive" button) to manually change between a pure electrical operating mode (E-mode) and an automatic operating mode (A-mode) with an optionally startable combustion engine 3 and a navigation system 10.

Furthermore, an electronic transmission selection device 9 is available in the hybrid vehicle that is known per se (for example from BMW serial vehicles), via which driving positions P, R, N and D that are usually provided for automatic transmission 4 as well as a switch position "S" can be selected by the driver for the selection of a sporty automatic mode.

Finally, in FIG. 1, an acceleration pedal FP, which is also known, is schematically illustrated, the displacement of which is, for example detected via a potentiometer, as is known.

The drive control system of the hybrid vehicle is preferably carried out by a first electronic control device 5, by which, in principle, a wheel-torque-related overall drive control system can be carried out for all available drive engines (for example, known from patent applications DE 102011 004862 and DE 102011 005962). Furthermore, for example, a functional module GS-E ("Transmission control eDrive") is also contained in the control device 5 or preferably (as shown here) in a mechatronic additional control device 8 more closely assigned to the two-gear transmission 7 according to the invention. The functional module GS-E is, for example, designed as a software program module. By means of the functional module GS-E and the control devices 5 and/or 8, the two-gear transmission 7 can preferably be controlled using the especially advantageous sequence control system shown in FIG. 2.

Control devices 5 and 8 are preferably connected to each other via a data bus (e.g. CAN) and, if required, exchange sensor and control signals. For example, the control device 8 can obtain the vehicle speed v as information from control device 5.

The control device 8 has a functional module that is designed in such a way (in particular programmed) that a shift can be initiated between the first gear GN and the second gear GH depending on the operation of the selection device (Max-E-Drive Button).

However, the functional module GS-E is designed in such a way (in particular programmed) that a shift can be initiated between the first gear GN and the second gear GH depending on the other predetermined conditions.

To shift gears, the torque of the electric engine 1 is reduced to at least almost zero since the two-gear transmission 7 does not have a clutch that can be opened for traction interruption.

Thereby, a shift change is, for example, introduced by means of a target gear jump (e.g. in the form of a digital upshift or downshift command within a software program).

Figure 2:
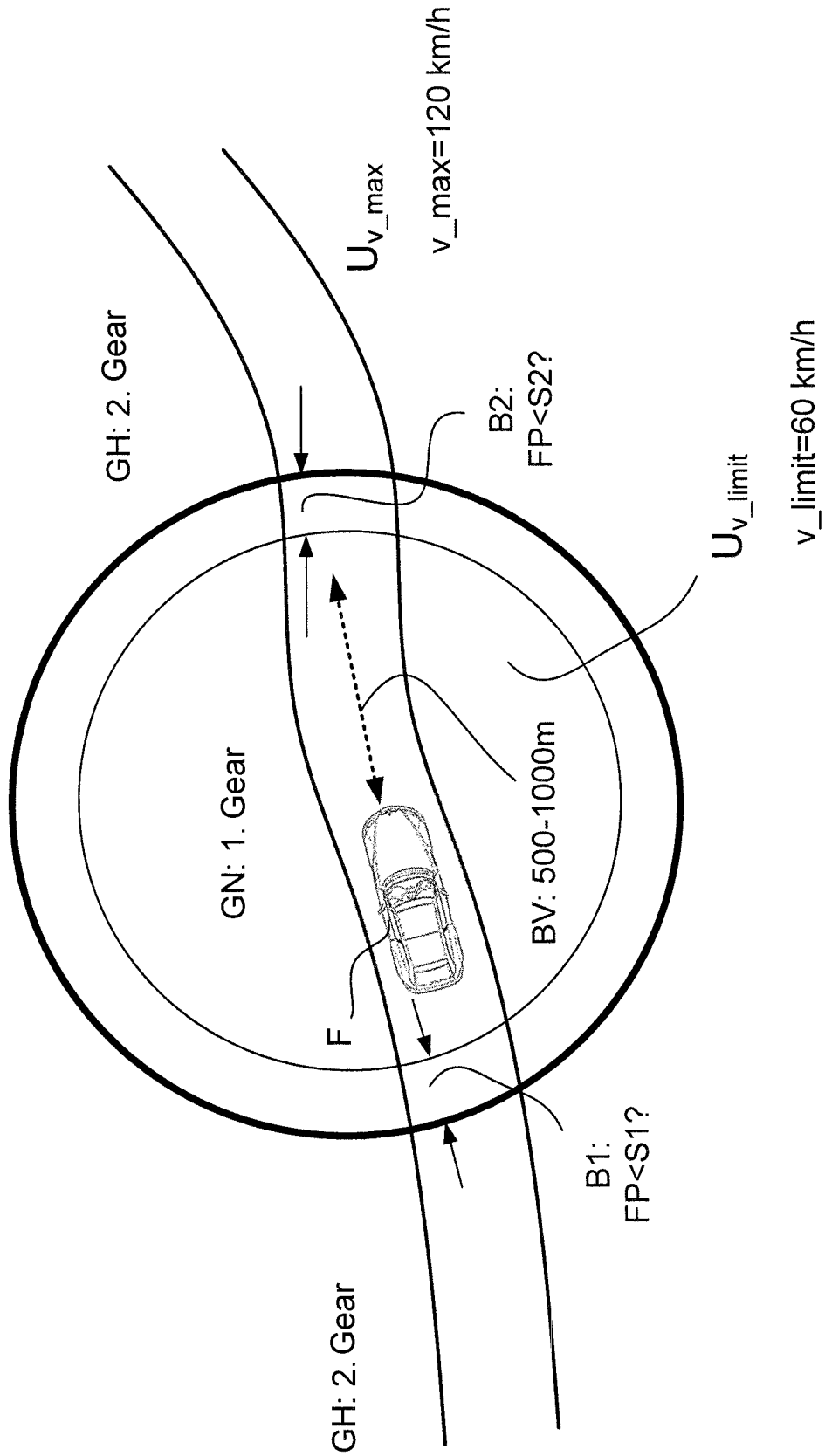
FIG. 2 shows a schematic representation of the effect of the control method according to the invention.

The control system for the shift change according to the invention is explained with reference to the exemplary embodiment according to FIG. 2.

In the electronic control unit, for example in the form of an individual control device or, here, in the form of a main control device 5 and in the form of an additional control device 8, data are received from a driving-speed-related data source for a defined forecast range BV in front of the vehicle F, here, for example, of the on-board navigational systems 10. These data are then evaluated to determine if a region Uv_limit with a limit speed v_limit under the maximum speed v_max of the lower gear GN is present at least within the forecast range BV. Here, the limit speed v_limit is, for example, 50 km/h (urban area) and the maximum speed v_max (=RPM-related maximum possible driving speed) of the lower gear GN here is 120 km/h. The forecast range BV is preferably defined to be approximately 500 m to 1000 m. If the vehicle F is in a transition region B1 before the region Uv_limit or in the region Uv_limit, it is shifted to the lower gear GN or the lower gear GN is maintained when the accelerator pedal angle FP is below a defined first threshold S1 and the driving speed v is at least under the maximum driving speed v_max of the lower gear GN of 120 km/h.

A shift is preferably made from a lower gear GN to a higher gear GH if, within a transition region B2 between the region Uv_limit and a region Uv_max with a possible driving speed v above the maximum speed v_max, the accelerator pedal angle FP is under a defined second threshold S2 and the driving speed v is under the maximum speed v_max.

The first threshold S1 and the second threshold S2 are variably defined in terms of a hysteresis and ensure, for example, a propulsion operation during the gear shift.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A control method in a vehicle to shift an automatic transmission having at least two gears, the method comprising the steps of:

receiving, via at least one electronic control unit, data of a driving-speed-related data source for a defined forecast range, where a first region lying within the forecast range with a first limit speed that is under a maximum speed of a lower gear is detectable from the data; and maintaining the lower gear or making a downshift to the lower gear if the first region has been detected within the defined forecast range.

2. The control method as claimed in claim 1, wherein, by way of the control unit, the downshift to the lower gear is only performed if the driving speed is under the maximum speed of the lower gear.

3. The control method as claimed in claim 1, wherein, by way of the control unit, the downshift to the lower gear is only performed if the driving speed is under the maximum speed of the lower gear and a driver power request value is under a defined first threshold.

4. The control method as claimed in claim 3, wherein, by way of the control unit, a shift is performed from the lower gear to a higher gear if, within a transition region between the first region and a second region with a second limit speed or possible driving speed that is above the maximum speed, the driving speed is below the maximum speed of the lower gear.

5. The control method as claimed in claim 4, wherein, by way of the control unit, a shift is performed from the lower gear to the higher gear if, within the transition region between the first region and the second region with the second limit speed or the possible driving speed that is above the maximum speed, the driver power request value is under a defined second threshold.

6. The control method as claimed in claim 1, wherein, by way of the control unit, the downshift to the lower gear is only performed if a driver power request value is under a defined first threshold.

7. The control method as claimed in claim 1, wherein, by way of the control unit, a shift is performed from the lower gear to a higher gear if, within a transition region between the first region and a second region with a second limit speed or possible driving speed that is above the maximum speed, the driving speed is below the maximum speed of the lower gear.

8. The control method as claimed in claim 1, wherein, by way of the control unit, a shift is performed from the lower gear to a higher gear if, within a transition region between the first region and a second region with a second limit speed or a possible driving speed that is above the maximum speed, a driver power request value is under a defined second threshold.

9. A control device in a vehicle to shift an automatic transmission having at least two gears, comprising:
  at least one electronic control unit executing a program to:
    receive, via at least one electronic control unit, data of a driving-speed-related data source for a defined forecast range, where at least one region lying within the forecast range with a limit speed under a maximum speed of a lower gear is detectable from the data; and
    maintain the lower gear or making a downshift to the lower gear if such a region has been detected within the defined forecast range.

* * * * *